United States Patent
Eto

(10) Patent No.: US 6,836,505 B2
(45) Date of Patent: Dec. 28, 2004

(54) SPREADING CODE GENERATION APPARATUS AND CDMA RECEIVER

(75) Inventor: Yuzo Eto, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 755 days.

(21) Appl. No.: 09/778,095

(22) Filed: Feb. 7, 2001

(65) Prior Publication Data

US 2001/0024467 A1 Sep. 27, 2001

(30) Foreign Application Priority Data

Feb. 10, 2000 (JP) ........................................ 2000-033696

(51) Int. Cl.⁷ .............................................. H04B 1/707
(52) U.S. Cl. ........................ 375/142; 375/150; 370/355
(58) Field of Search ................................ 375/149, 150, 375/147, 148, 142, 130, 140, 141, 145, 143, 152; 370/335, 320, 314, 342, 311; 455/423, 69, 67.11

(56) References Cited

U.S. PATENT DOCUMENTS

| | | | |
|---|---|---|---|
| 5,936,999 A | | 8/1999 | Keskitalo |
| 5,940,432 A | * | 8/1999 | Saito et al. .................. 375/148 |
| 5,956,367 A | | 9/1999 | Koo et al. ................... 375/340 |
| 6,373,881 B1 | * | 4/2002 | Mizuguchi et al. ......... 375/147 |
| 6,414,984 B1 | * | 7/2002 | St.ang.hle ................... 375/142 |
| 6,452,959 B1 | * | 9/2002 | McDonough ............... 375/130 |
| 6,463,048 B1 | | 10/2002 | Garyantes |

FOREIGN PATENT DOCUMENTS

| | | |
|---|---|---|
| EP | 0963070 | 12/1999 |
| EP | 1071222 | 1/2001 |
| JP | 8-65264 | 3/1996 |
| JP | 11-74820 | 3/1999 |
| JP | 11252044 | 9/1999 |
| JP | 2000-41022 | 2/2000 |

OTHER PUBLICATIONS

English Language Abstract of JP 11–74820.
English Language Abstract of JP 2000–41022.
English Language Abstract of JP 11–252044.
English Language Abstract of JP 8–65264.

* cited by examiner

Primary Examiner—Shuwang Liu
Assistant Examiner—Ted Wang
(74) Attorney, Agent, or Firm—Greenblum & Bernstein, P.L.C.

(57) ABSTRACT

The spreading code generation apparatus of the present invention temporarily stores a spreading code string generated from one spreading code generator in memory (shift register or RAM).

Then, after providing a necessary delay based on synchronization acquisition information output from a searcher, the code generation apparatus supplies the spreading code stored in memory to one of a plurality of correlators. This makes it possible to give a spreading code whose phase is adjusted to correspond to a specific path of multi-paths to the correlator.

3 Claims, 7 Drawing Sheets

SPREADING CODE GENERATION APPARATUS AND CDMA RECEIVER

BACKGROUND OF THE INVENTION

1. Field of the Invention

The present invention relates to a spreading code generation apparatus and CDMA receiver used in spread spectrum communications.

2. Description of the Related Art

According to a CDMA (Code Division Multiple Access) communication system, it is possible to increase reception power by receiving a plurality of arriving signals (delay signals) with different delays and combining these reception signals.

A CDMA receiver has a plurality of reception fingers corresponding to different delay signals.

Each reception finger has a spreading code (despreading code) generator capable of controlling timing of spreading code (despreading code) generation in accordance with the amount of delay of the corresponding delay signal.

FIG. 1 of the Unexamined Japanese Patent Publication No.HEI 11-74820 discloses a configuration that individually provides one spreading code generator for each of a plurality of reception fingers.

Adopting the configuration that individually provides one spreading code generator for each of a plurality of reception fingers will increase the volume of hardware and also increase the area occupied by an LSI chip. This will also increase power consumption of the LSI.

It is an object of the present invention to reduce the area occupied by the LSI chip and power consumption of the LSI by simplifying the circuit for generating a spreading code corresponding to each delay signal.

SUMMARY OF THE INVENTION

The spreading code generation apparatus of the present invention temporarily stores a spreading code string generated from one spreading code generator in memory (shift register or RAM). Then, after providing a necessary delay, the spreading code generation apparatus supplies the spreading code stored in memory to a corresponding correlator. This can reduce the number of spreading code generators and can also reduce power consumption of the circuit.

One aspect of the spreading code generation circuit of the present invention stores a spreading code string generated from one spreading code generator in a shift register. The shift register is configured in such away that data is output in parallel from each tap.

Then, the spreading code generation apparatus selects one of spreading codes with different delays output in parallel from memory based on synchronization acquisition information output from a searcher. This makes it possible to generate spreading codes with the phases adjusted to corresponding multi-paths.

Another aspect of the spreading code generation circuit of the present invention stores a spreading code string generated from one spreading code generator in RAM. Then, the spreading code generation circuit controls the timing of supplying read addresses to the RAM based on synchronization acquisition information output from a searcher. This makes it possible to generate spreading codes with phases adjusted to corresponding multi-paths.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, embodiments of the present invention will be explained below.

Embodiment 1

Figure 1:
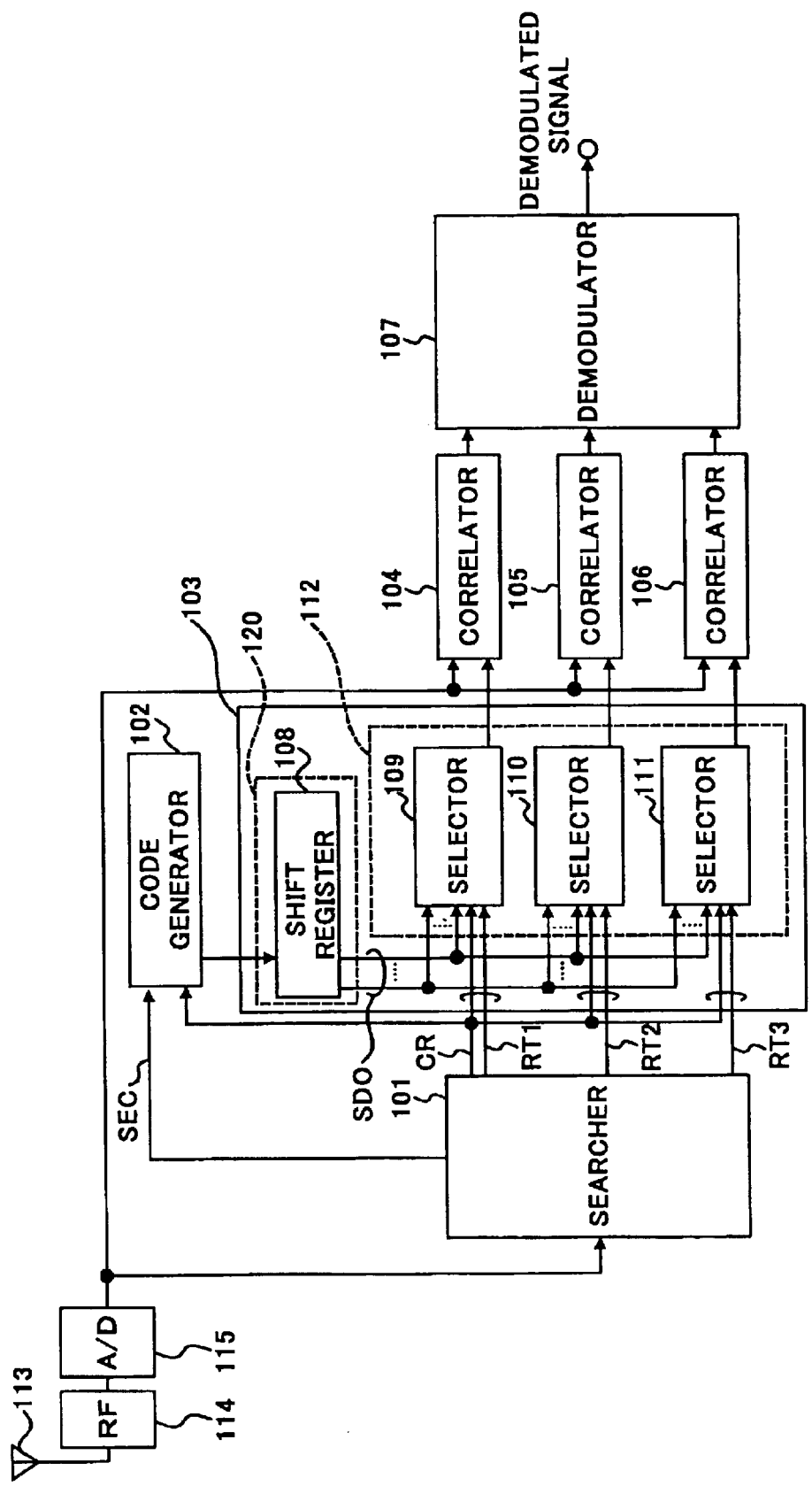
FIG. 1 is a block diagram showing an overall configuration of a CDMA reception apparatus according to an embodiment of the present invention.

FIG. 1 is a block diagram showing an overall configuration of a CDMA receiver according to an embodiment of the present invention.

A radio wave that has arrived through a plurality of paths (multi-paths) is received by antenna 113 and amplified by RF amplifier 114. Then, the analog output signal of RF amplifier 114 is converted to a digital signal by A/D converter 115.

The digital signal after A/D conversion is supplied to searcher 101 and a plurality of correlators 104 to 106. Correlators 104 to 106 correspond to the respective multi-paths.

Searcher 101 acquires synchronization for the individual path components included in the received CDMA signal in a multi-path environment.

That is, searcher 101 multiplies the spread/modulated reception signal by a spreading code while shifting timing (this is called "searching") using a built-in correlator for synchronization acquisition (not shown). Searcher 101 then repeats searches over a predetermined time width (this is called "search path width") to measure correlation values at different timings.

Then, searcher 101 outputs synchronization acquisition information including path reference information (CR) and relative path information (RT1 to RT3) acquired based on the search results.

Here, the path reference information (CR) is reference timing information necessary to specify relative positional relationship between a plurality of paths. Furthermore, the relative path information (RT1 to RT3) is delay time information relative to the reference timing indicated by the path reference information.

Figure 3:
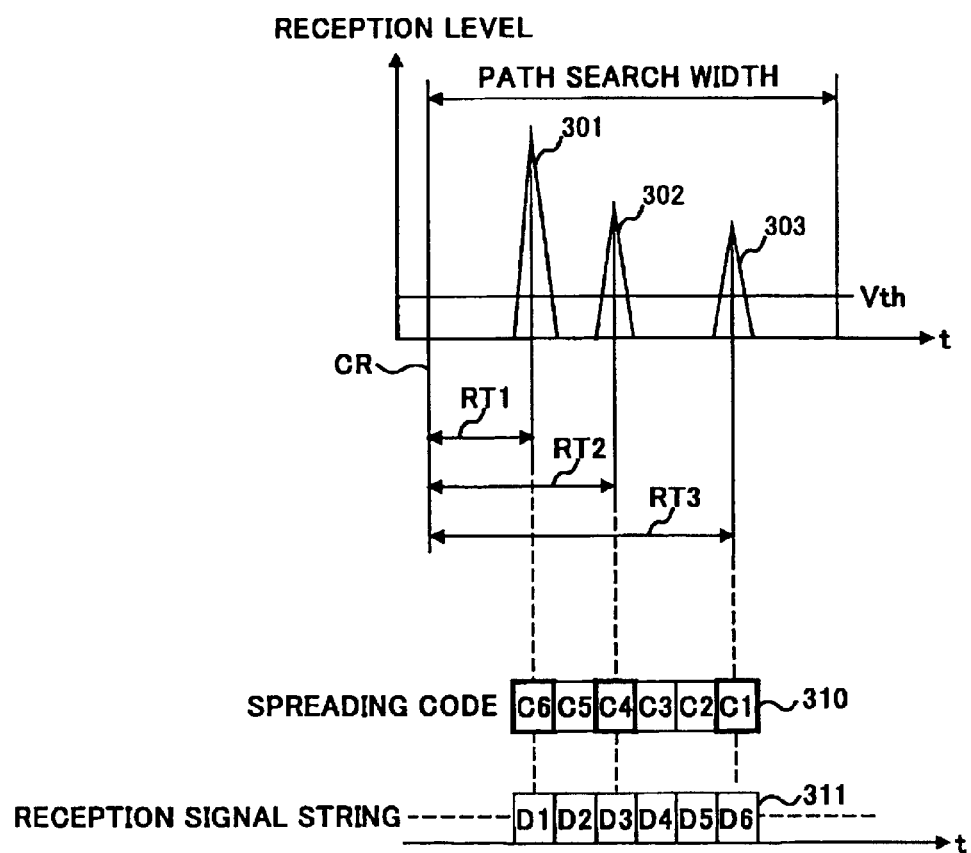
FIG. 3 is a drawing to explain a correlation between a delay profile of a received CDMA signal and the phase of a spreading code.

The upper part of FIG. 3 shows a mutual relationship between a delay profile of the reception signal, reference information (CR) and relative path information (RT1 to RT3).

Correlation peaks 301, 302 and 303 in FIG. 3 correspond to the first path, second path and third path, respectively.

The path reference information (CR) indicates the reference timing necessary to specify relative positions of correlation peaks (paths) 301 to 303.

Furthermore, the relative path information (RT1, RT2 and RT3) indicates a relative time difference (delay time) between the reference timing indicated by the path reference information (CR) and correlation peaks 301, 302 and 303, respectively.

As shown in the lower part of FIG. 3, it is possible to specify spreading codes synchronized with paths 301, 302 and 303 using the path reference information (CR) and relative path information (RT1 to RT3). In FIG. 3, C6, C4 and C1 in spreading code string 310 are the spreading code bits that correspond to paths 301, 302 and 303, respectively. Reference numeral 311 in FIG. 3 denotes a reception signal string.

On the other hand, code generator 102 starts to generate spreading codes (despreading codes) using the timing at which path reference information (CR) is output from searcher 101 as a reference.

The type (pattern), etc. of a spreading code to be generated is determined by a pattern selection signal (SEC) given from searcher 101.

Figure 2:
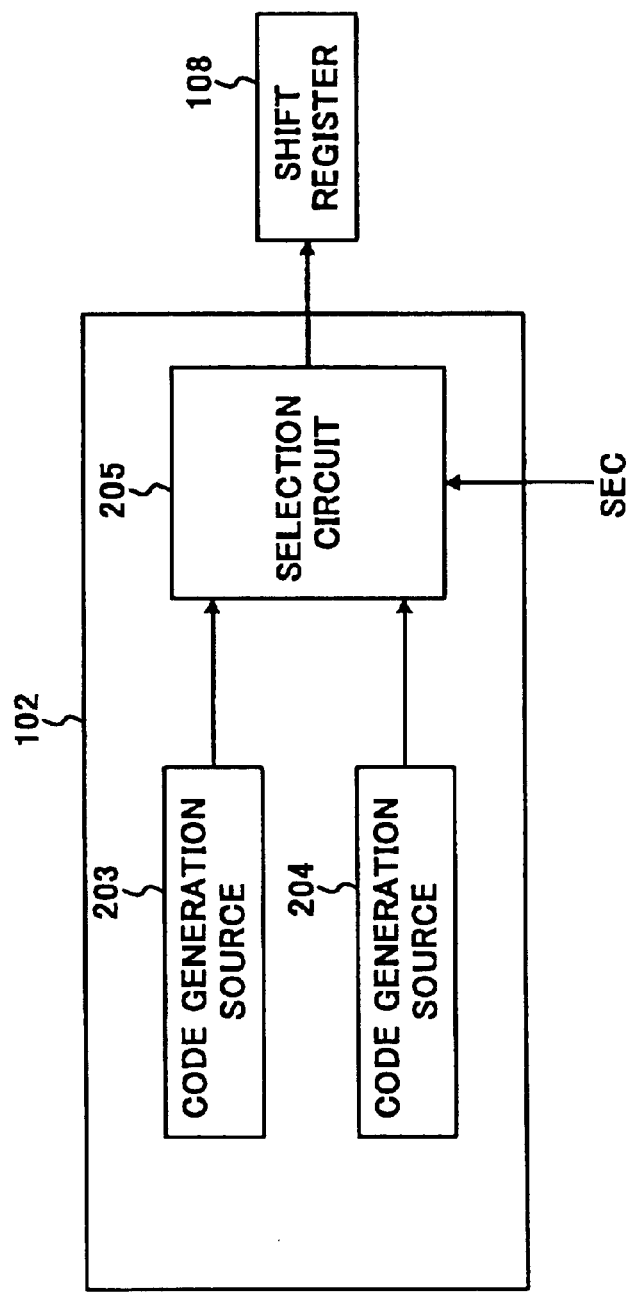
FIG. 2 is a block diagram showing a configuration of the spreading code generator shown in FIG. 1.

FIG. 2 shows an example of an internal configuration of code generator 102.

As shown in the figure, code generator 102 has code generation sources 203 and 204 that generate codes of different types (patterns).

Selection circuit 205 selects either of the spreading codes based on the selection signal (SEC) given from searcher 101 and gives the spreading code to shift register 108.

Memory section 120 contains shift register 108. This shift register has a configuration of outputting data items in parallel from different taps. In FIG. 1, all the spreading code data bits output in parallel from shift register 108 are collectively expressed as SDO.

Selection section 112 has three selectors 109, 110 and 111. Each selector corresponds to each path of the multi-paths.

All the spreading code data bits (SDO) output in parallel from shift register 108 are input to selectors 109 to 111.

Furthermore, the path reference information (CR) and relative path information (RT1) about the first path output from searcher 101 are input to selector 109.

Likewise, the path reference information (CR) and relative path information (RT2) about the second path output from searcher 101 are input to selector 110.

Likewise, the path reference information (CR) and relative path information (RT3) about the third path output from searcher 101 are input to selector 111.

Selectors 109 to 111 each select one data bit from all the spreading code data bits (SDO) based on the path reference information (CR) and relative path information (RT1 to RT3) given from searcher 101. The selected spreading code data bit is the data bit that has a desired delay corresponding to each path. The selected data bits are given to correlators (104 to 106).

That is, shift register 108 and selectors 109 to 111 function as a timing adjustment circuit to adjust timings at which the spreading codes generated by code generator 102 are given to the correlators (104, 105 and 106).

Correlators 104 to 106 perform despreading on the reception data using the given spreading code string. The despread signals are sent to demodulator 107. Demodulator 107 performs demodulation processing on each reception signal of each path and outputs the demodulated signal. The demodulated signal of each path is combined (RAKE combining) as required.

Such a configuration can give a time delay corresponding to each path to a spreading code generated from one code generator, thus creating spreading codes with various delays.

With a simplified configuration, this embodiment is advantageous for reducing the LSI chip area and can also reduce power consumption of the circuit. Moreover, the use of only a general-purpose circuit instead of using a special circuit facilitates the implementation of this circuit.

Then, a specific example of a circuit configuration of the spreading code generation apparatus of the present invention will be explained using FIG. 4.

Figure 4:
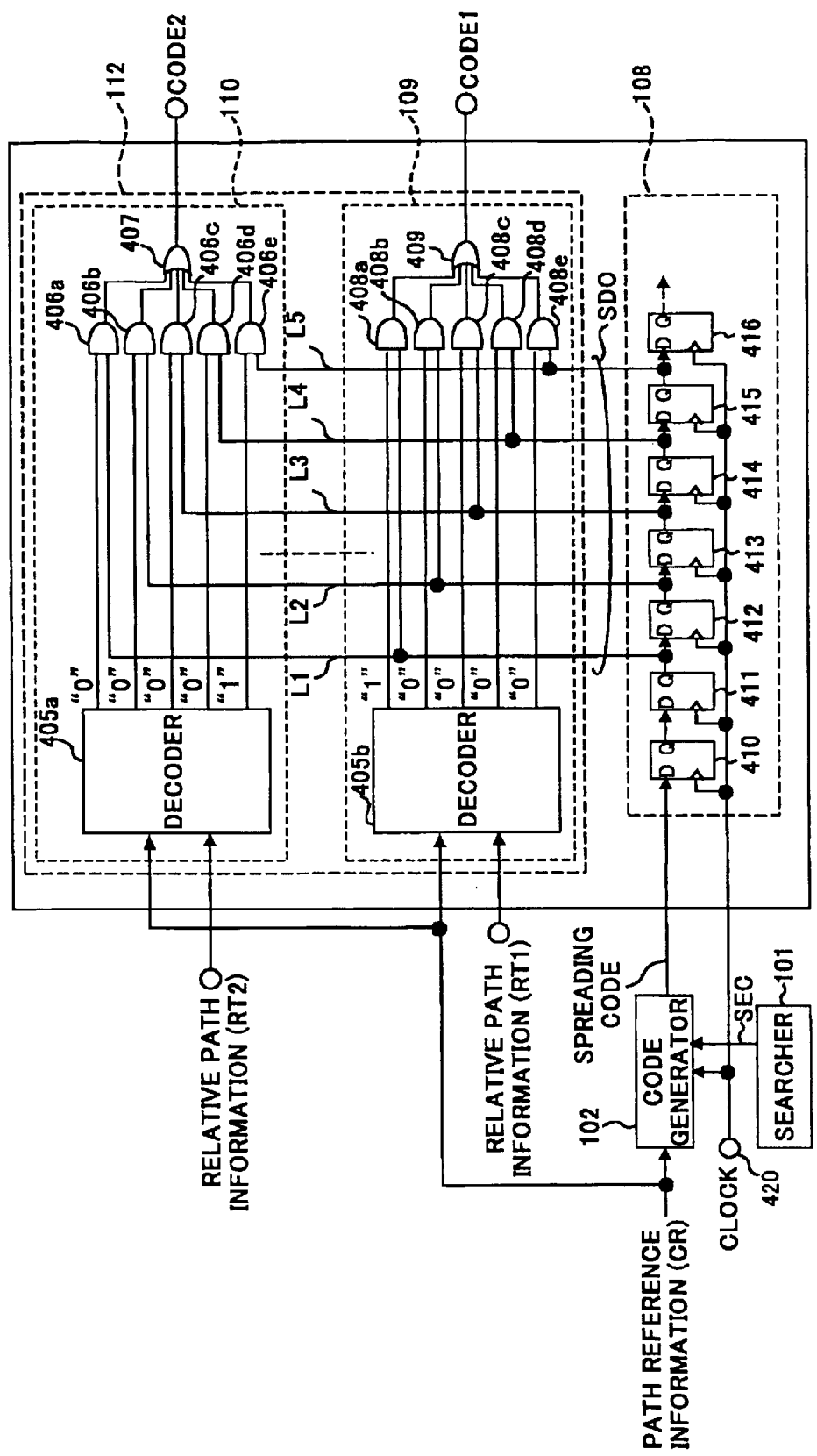
FIG. 4 is a circuit diagram showing a more specific configuration of the reception apparatus shown in FIG. 1.

The circuit shown in FIG. 4 is a circuit obtained by further crystallizing the circuit shown in FIG. 1. To avoid complication of the drawing, FIG. 4 shows only a configuration for generating spreading codes corresponding to two paths.

As shown in FIG. 4, shift register 108 functions as a circuit to give a delay to the reception signal. Shift register 108 consists of a plurality of flip flops 410 to 416.

Data bits (L1 to L5) are output from the output ends (taps) of the flip flops.

A clock (hereinafter referred to as "chip clock") synchronous with a chip, which is a minimum unit of a spreading signal is input to terminal 420 in FIG. 4. Shift register 108 operates in synchronization with the chip clock. The more flip flops that make up shift register 108 the spreading code passes, the greater the delay of the phase of the spreading code becomes.

Since each of the data bits (L1 to L5) output in parallel from shift register 108 has the number of flip flops through which the data bit has passed varying from one data bit to another, the amount of delay also differs from one data bit to another.

Furthermore, selectors 109 and 110 each have decoders 405b and 405a for decoding path reference information (CR) and relative path information (RT1, RT2) entered.

Likewise, selectors 109 and 110 are each equipped with gates (408a to 408e, 409, 406a to 406e and 407) to select desired spreading codes from among the data bits output in parallel from shift register 108.

Decoders 405b and 405a owned by selectors 109 and 110 respectively are decoders with 2 inputs and 5 outputs (2:5 decoders). That is, decoders 405b and 405a perform decoding using the path reference information (CR) and relative path information (RT1 or RT2) as inputs and set only one bit of the 5 output bits to "1" as the decoding result.

This activates only one of AND gates 406a to 406e and 408a to 408e and selects the spreading code bit input to the AND gate.

In FIG. 4, only the output bit at the bottom of decoder 405a is set to "1". Thus, code 2 is output via AND gate 406e and OR gate 407.

Likewise, in FIG. 4, only the output bit at the top of decoder 405b is set to "1". Thus, code 1 is output via AND gate 408a and OR gate 409.

This configuration allows spreading codes to be generated automatically and continuously when there is no change in the path reference information (CR) and relative path information (RT1 to RT3).

Embodiment 2

Figure 5:
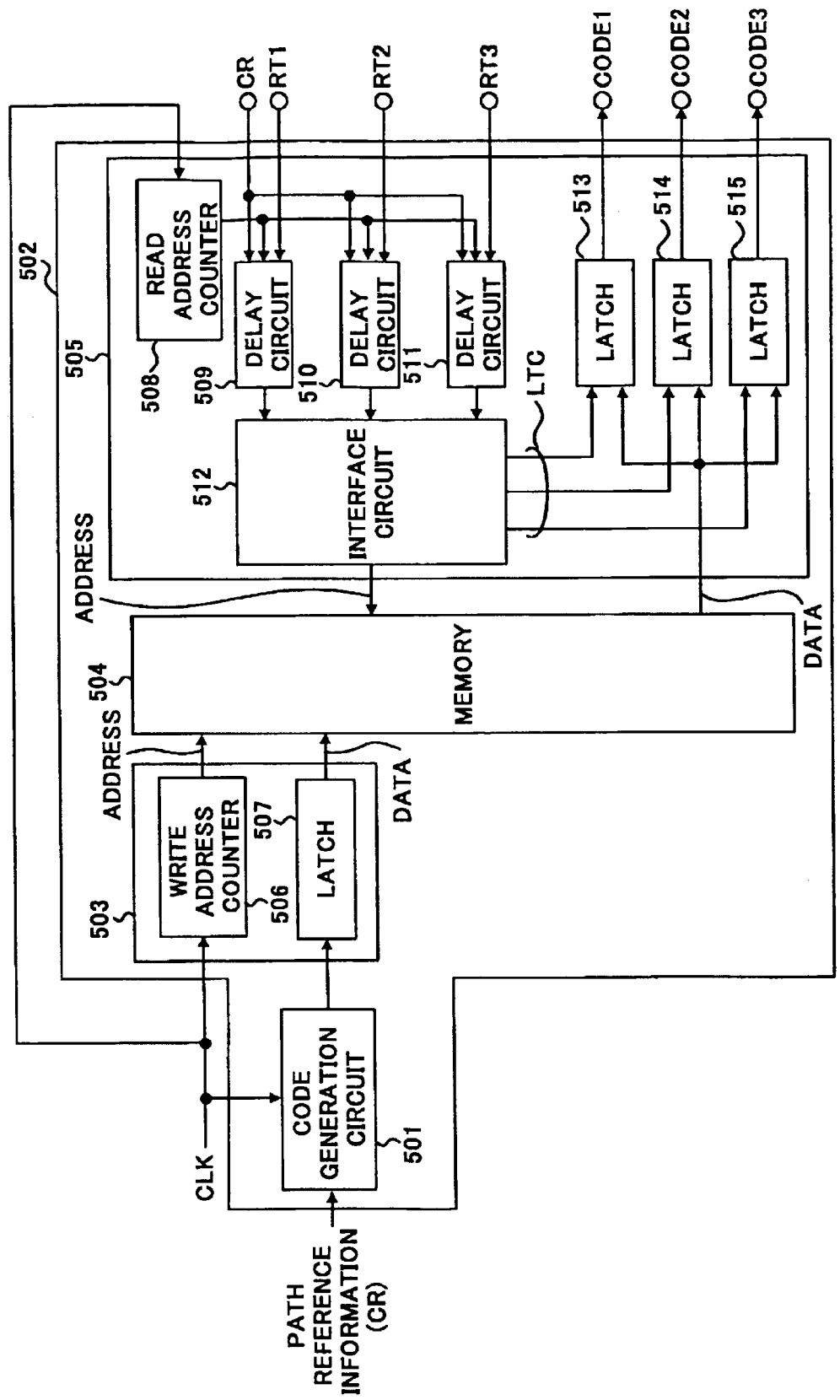
FIG. 5 is a block diagram showing a configuration of a CDMA reception apparatus according to an embodiment of the present invention.

FIG. 5 is a block diagram showing a configuration of a spreading code generation apparatus of this embodiment.

The spreading code generation apparatus of this embodiment temporarily stores spreading code data in memory (RAM). The spreading code generation apparatus then controls the timing at which read addresses are supplied to memory (RAM) based on synchronization acquisition information output by a searcher. That is, the spreading code generation apparatus generates a spreading code with a desired delay by controlling the read timing of the RAM.

As shown in FIG. 5, spreading code generation apparatus 502 is equipped with code generator 501, RAM 504, write access circuit 503 and read access circuit 505.

Write access circuit 503 includes write address counter 506 and latch 507.

Furthermore, read access circuit 505 includes read address counter 508, delay circuits 509 to 511, interface circuit 512 and latches 513 to 515.

Operation of the spreading code generation apparatus in such a configuration will be explained using FIG. 6. The circuit configuration of FIG. 6 is equivalent to the circuit configuration of FIG. 5.

Figure 6:
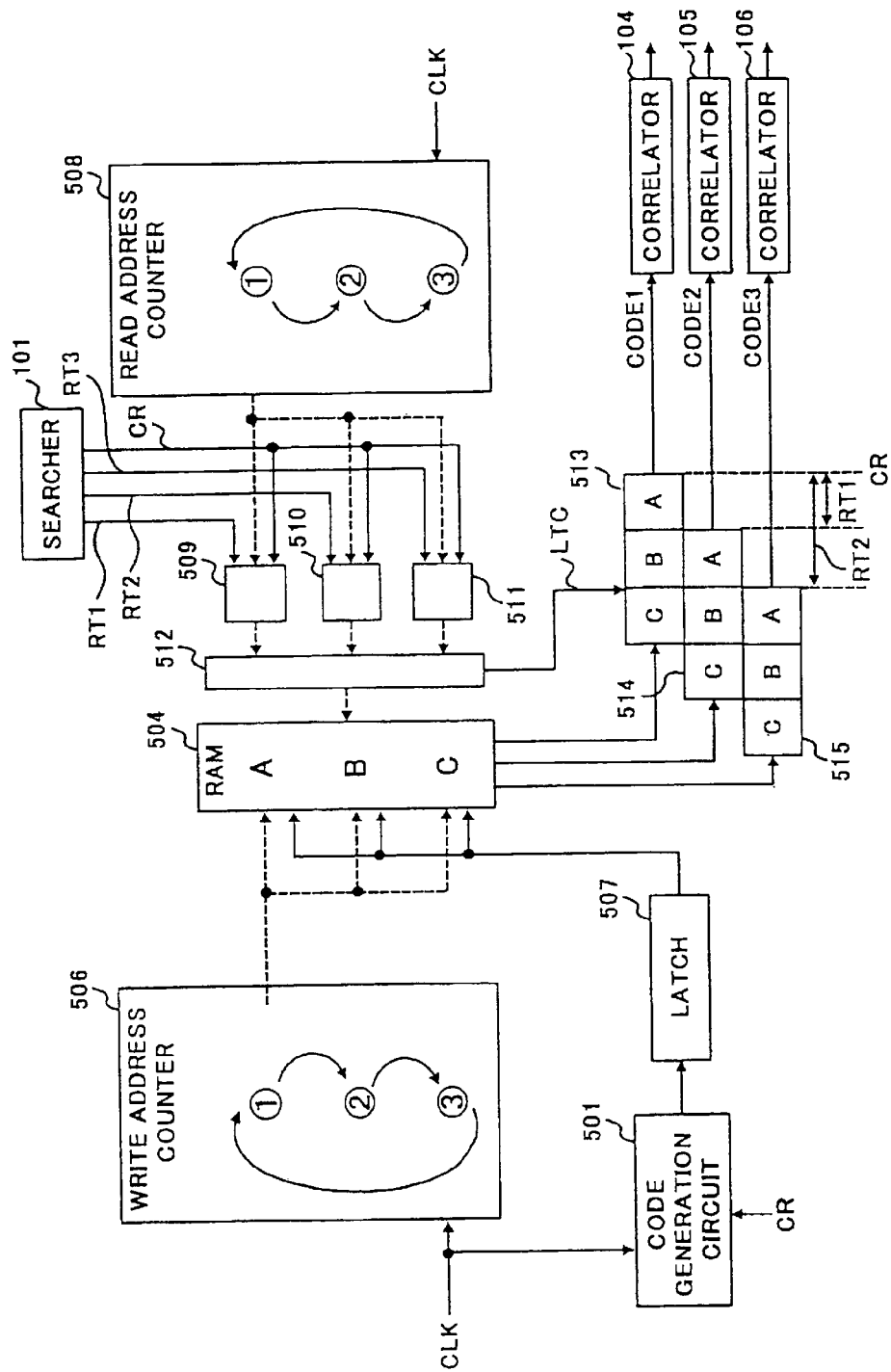
FIG. 6 is a block diagram to more specifically explain operation of the CDMA reception apparatus in FIG. 5.

As shown in FIG. 6, write address counter 506 increments (or decrements) the counter in synchronization with a chip clock CLK. When the write address exceeds a predetermined address range, the count returns to the initial address.

Here, the predetermined address range is the address range that corresponds to the path search width shown in FIG. 3.

In FIG. 6, suppose write address counter 506 generates addresses ①, ② and ③ sequentially.

Code generation circuit 501 generates a spreading code in synchronization with the chip clock CLK relative to the path reference information (CR).

Now, suppose codes "A", "B" and "C" are generated from code generation circuit 501.

Codes "A", "B" and "C" are each stored at addresses ①, ② and ③ of RAM 504 via latch 507, respectively.

On the other hand, read address counter 508 also increments (or decrements) the counter in synchronization with the chip clock CLK as in the case of write address counter 506. When the read address exceeds a predetermined address range, the count returns to the initial address.

In FIG. 6, suppose read address counter 508 generates addresses ①, ② and ③ sequentially.

The read addresses (①, ② and ③) generated are input to delay circuits 509, 510 and 511 in parallel.

Delay circuits 509, 510 and 511 delay the timing of outputting read addresses by a required time based on path reference information (CR) and relative path information (RT1, RT2 and RT3) given from searcher 101. That is, delay circuits 509, 510 and 511 can adjust the output timing of read addresses according to each path by giving necessary delays to the read addresses.

Controlling the output timings of read addresses indirectly causes timings at which spreading codes are output from RAM 504 to be controlled. As a result, the spreading code generation timing can be adjusted according to the relative position of each path.

That is, RAM 504 and read access control circuit (508, 509, 510 and 511) function as a timing adjustment circuit for adjusting the timings at which spreading codes generated by code generation circuit 501 are supplied to correlators 104, 105 and 106.

Interface circuit 512 selects one of address signals output in parallel from delay circuits 509, 510 and 511 and supplies the address signal to RAM 504. Furthermore, interface circuit 512 supplies a control signal LTC, which indicates the timing at which the address signal is supplied to RAM, to latches 513, 514 and 515.

Latches 513, 514 and 515 capture spreading codes output from RAM 504 at the timing at which the control signal LTC is input.

The spreading codes captured into latches 513, 514 and 515 are supplied to correlators 104, 105 and 106, respectively.

Here, in the explanation in FIG. 6, the write addresses and the read addresses are the same, but the present invention is not limited to this. A difference may also be forcibly provided between the write addresses and the read addresses.

Furthermore, in the explanation above, a chip clock is used as the operating clock of each circuit, but the present invention is not limited to this. When, for example, an oversampling type A/D converter is used as A/D converter 115 in FIG. 1, an oversampling clock may also be set as the operating clock of each circuit in FIG. 6.

As explained above, using the spreading code generation apparatus of the present invention makes it possible to efficiently generate spreading codes with delays according to paths with a simple configuration. With a simplified circuit configuration, it is possible to reduce the size of the LSI chip as well as power consumption.

A CDMA receiver equipped with the spreading code generation apparatus of the present invention has excellent characteristics such as compactness and low power consumption.

Furthermore, in synchronization acquisition with the CDMA receiver, changing a path to be followed generally involves great burden on software processing such as resetting of the code generator and calculation of code phases. The present invention performs most of such troublesome processing by hardware, and therefore has an advantage of the ability to reduce burden on software.

Figure 7:
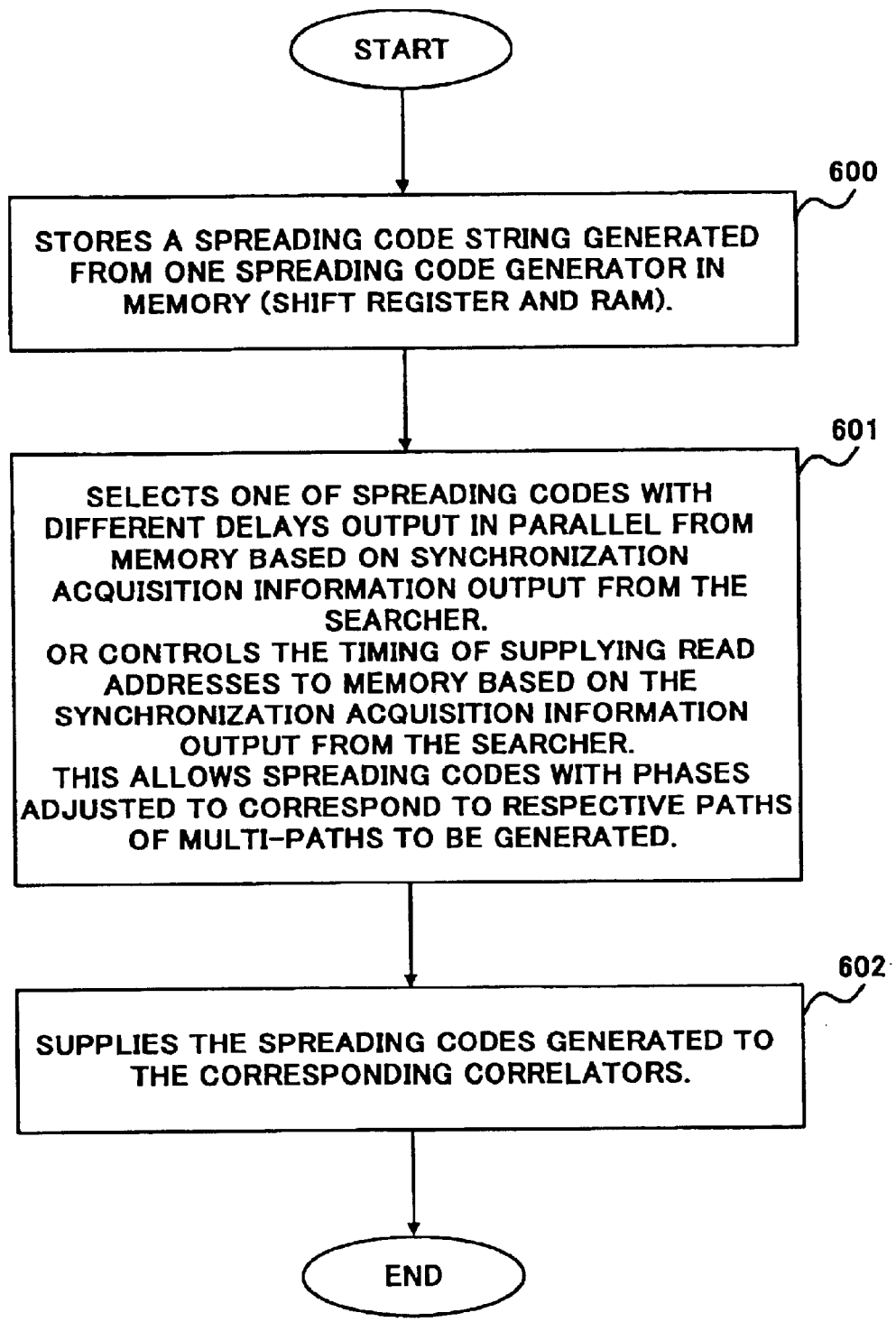
FIG. 7 is a flowchart showing a main procedure of a spreading code generating method of the present invention.

FIG. 7 shows the main procedure of the method of generating spreading codes of the present invention.

That is, a spreading code string generated from one spreading code generator is stored in memory (shift register or RAM) (step 600).

Then, according to Embodiment 1, one of spreading codes with different delays output in parallel from memory is selected based on the synchronization acquisition information output from the searcher. According to Embodiment 2, the timing at which a read address is supplied to memory is controlled based on the synchronization acquisition information output from the searcher. This makes it possible to generate spreading codes with the phases adjusted to corresponding multi-paths (step 601).

Then, the spreading codes generated are supplied to their respective correlators (step 602).

According to the spreading code generating method of the present invention, the phases of spreading codes are controlled by controlling data capturing timing and memory access timing. Such control can be easily implemented using generally used circuits.

The present invention is not limited to the above described embodiments, and various variations and modifications may be possible without departing from the scope of the present invention.

This application is based on the Japanese Patent Application No.2000-033696 filed on Feb. 10, 2000, entire content of which is expressly incorporated by reference herein.

What is claimed is:

1. A spreading code generation apparatus comprising:

a spreading code generator;

a shift register that temporarily stores spreading codes generated from said spreading code generator and outputs said spreading codes with different delays in parallel from respective taps;

a searcher that acquires a synchronization of a CDMA signal received through multi-paths and outputs synchronization acquisition information including reference timing information necessary to specify a relative positional relationship between oaths and delay time information on delays relative to the reference timing;

a plurality of correlators provided according to said paths that despread said CDMA signal at timings corresponding to the respective paths of said multi-paths; and at least one selector provided between said shift register and said plurality of correlators that selects one of spreading codes with different delays output in parallel from the respective taps of said shift register based on said synchronization acquisition information output from said searcher and supplies the selected spreading code to one of said plurality of correlators, said at least one selector comprising:

decoders that decode said synchronization acquisition information and generate a plurality of data bits in parallel; and a plurality of gate circuits, each gate circuit receiving as inputs one of a plurality of spreading codes with different delays output in parallel from the respective taps of said shift register and one bit of said plurality of data bits output from said decoder and controlling whether output of said spreading code entered should be enabled or disabled according to the value of said one bit.

2. A CDMA receiver equipped with the spreading code generation apparatus according to claim 1.

3. A method of generation a spreading code comprising:

generating a spreading code;

temporarily storing spreading code generated in a shift register and outputting the spreading codes with different delays in parallel from respective taps of the shift register;

acquiring a synchronization of a CDMA signal received through multi-paths and outputting synchronization acquisition information including reference timing information necessary to specify a relative positional relationship between paths and delay time information on delays relative to the reference timing;

despreading the CDMA signal at timings corresponding to the respective paths of the multi-paths;

selecting one of spreading codes with different delays output in parallel from the respective taps based on the output synchronization acquisition information and supplying the selected spreading code to be despread, the selecting comprising decoding the synchronization acquisition information and generating a plurality of data bits in parallel, and, receiving one of a plurality of spreading codes with different delays output in parallel from the respective taps and one bit of the plurality of output data bits and controlling whether output of the input spreading code should be enabled or disabled in accordance with the value of the one bit.

* * * * *